No. 843,740. PATENTED FEB. 12, 1907.
W. B. FENN.
RING FOR SEALING JARS AND THE LIKE.
APPLICATION FILED APR. 16, 1906.

Witnesses
Benj. Finckel
Alice B. Cook.

Inventor
William B. Fenn
by Finckel & Finckel
his Attorneys

UNITED STATES PATENT OFFICE.

WILLIAM B. FENN, OF COLUMBUS, OHIO.

RING FOR SEALING JARS AND THE LIKE.

No. 843,740.

Specification of Letters Patent.

Patented Feb. 12, 1907.

Application filed April 16, 1906. Serial No. 311,904.

*To all whom it may concern:*

Be it known that I, WILLIAM B. FENN, a citizen of the United States, residing at Columbus, in the county of Franklin and State of Ohio, have invented certain new and useful Improvements in Rings for Sealing Jars and the Like; and I do hereby declare the following to be a full, clear, and exact description of the invention, such as will enable others skilled in the art to which it appertains to make and use the same.

The tops or mouths of glass jars are almost invariably of irregular or not truly circular form; nor are they exactly of uniform dimensions even where made in the same mold. These irregularities may be due to one or more of several causes, chief among which is, first, that precisely the same quantity of molten glass cannot each time be put into the mold; second, some parts of the jar may be cooled faster than others, and, third, the texture of the glass may not be uniform. Because of this irregularity in form and nonuniformity of size of the mouths of jars it has heretofore been found quite difficult to rapidly, economically, and perfectly seal large numbers of them.

The object of the present invention is to provide a remedy for the difficulty stated, said remedy consisting of a construction of sealing-ring adapted to quickly and automatically conform, within reasonable limits of course, to all irregularities of the shape and size of the jar.

The invention is more particularly pointed out in the following description and claims.

Figure 1:
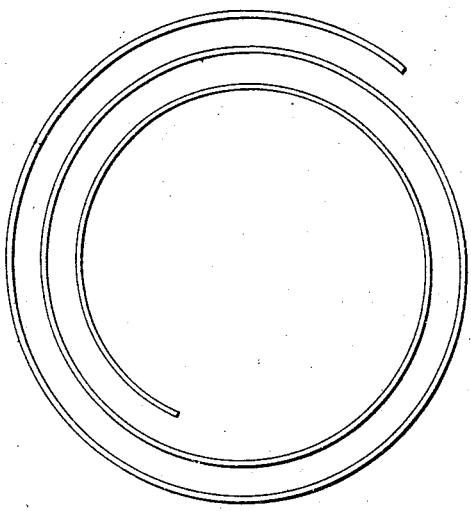
Figure 2:
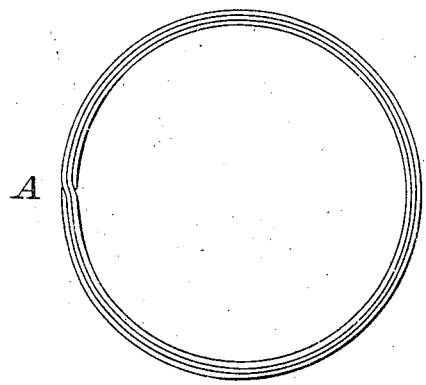
Figure 3:

In the accompanying drawings, in which is illustrated one embodiment of the invention, Figure 1 shows in plan view a strip that is to constitute a ring before it is closely coiled. Fig. 2 illustrates in similar view the strip completely coiled to form the ring. Fig. 3 is a side view of the ring with a quadrant cut out.

In the manufacture of the ring I use a material which may be simple or compound, adapted readily to slip upon itself, and which at the same time is moderately elastic and pliable or so that when the ring is subjected to pressure between a cover and the neck or throat of a jar it will automatically accommodate itself to irregularities thereof, both annularly by the slipping of the parts of the ring upon itself and laterally by the pliability and elasticity of the material.

A compound that possesses the characteristics referred to is made up of asbestos fiber and paraffin in proportions which may be varied; but I do not, of course, confine myself to any particular material or compound so long as it possesses the characteristics required.

I have discovered that the ring is best made of three complete coils or plies of a form and of dimensions adapted generally to the particular size of jar upon which the ring is to be used. When first formed, the end of the inner and outer coils should lie as nearly as practicable opposite each other, as seen at A in Fig. 2; but it is also practicable to make the ring of one or more coils, and I therefore do not wish to be understood as confining myself to the employment of a particular number of coils. When, however, the ring is made of one coil, the ends should overlap a little to permit the slipping and adjustment of the ring to the place of use.

I have shown the ring as being of frustoconical form, which is the most usual form, and as having its sides plain; but the form can be changed to suit the place and conditions of use.

With a ring thus constructed I have kept imperfectly-formed jars perfectly sealed for long periods of time and under adverse conditions.

What I claim, and desire to secure by Letters Patent, is—

1. A sealing-ring consisting of a coiled strip adapted to slip upon itself.

2. A sealing-ring consisting of a coiled strip of pliable material adapted to slip upon itself.

3. A sealing-ring consisting of a coiled strip of pliable and elastic material adapted to slip upon itself.

4. A sealing-ring consisting of a coiled strip the parts of which are free to move with reference to each other when subjected to pressure.

5. A sealing-ring consisting of a strip coiled to form three plies movable upon each other when subjected to pressure.

6. A sealing-ring consisting of a strip of pliable and elastic material coiled to form three plies movable upon each other and adapted to move with reference to each other when subjected to pressure.

7. A frusto-conical ring composed of several coils or plies of sealing material adapted to slip upon each other when subjected to pressure.

8. A sealing-ring consisting of a coiled strip adapted to slip upon itself, said ring being of frusto-conical form.

In testimony whereof I affix my signature in presence of two witnesses.

WILLIAM B. FENN.

Witnesses:
OLIN J. ROSS,
BENJ. FINCKEL.